US007661499B2

(12) United States Patent
Matsuyama

(10) Patent No.: US 7,661,499 B2
(45) Date of Patent: Feb. 16, 2010

(54) CONSTRUCTION MACHINE

(75) Inventor: Nobuo Matsuyama, Ishikawa (JP)

(73) Assignee: Komatsu Ltd, Tokyo (JP)

( * ) Notice: Subject to any disclaimer, the term of this patent is extended or adjusted under 35 U.S.C. 154(b) by 344 days.

(21) Appl. No.: 11/792,278

(22) PCT Filed: Nov. 30, 2005

(86) PCT No.: PCT/JP2005/021998

§ 371 (c)(1),
(2), (4) Date: Jun. 4, 2007

(87) PCT Pub. No.: WO2006/062018

PCT Pub. Date: Jun. 15, 2006

(65) Prior Publication Data

US 2008/0093145 A1 Apr. 24, 2008

(30) Foreign Application Priority Data

Dec. 10, 2004 (JP) ............................ 2004-358078

(51) Int. Cl.
*B60K 31/00* (2006.01)

(52) U.S. Cl. ....................... 180/174; 180/170; 180/171; 180/173; 180/197

(58) Field of Classification Search ................. 180/170, 180/171, 173, 174, 197; 701/50, 99, 110
See application file for complete search history.

(56) References Cited

U.S. PATENT DOCUMENTS

| | | | | |
|---|---|---|---|---|
| 4,523,564 | A * | 6/1985 | Sturdy | 123/361 |
| 4,763,262 | A * | 8/1988 | Leiber | 701/90 |
| 4,771,849 | A * | 9/1988 | Leiber et al. | 180/197 |
| 4,785,904 | A * | 11/1988 | Leiber et al. | 180/197 |
| 4,836,165 | A * | 6/1989 | Kubota et al. | 123/357 |
| 5,019,986 | A * | 5/1991 | Londt et al. | 701/94 |
| 5,765,657 | A * | 6/1998 | Fukumura et al. | 180/197 |
| 5,989,154 | A * | 11/1999 | Christensen et al. | 477/111 |
| 6,282,481 | B1 * | 8/2001 | Hosomi | 701/84 |
| 6,306,063 | B1 * | 10/2001 | Horgan et al. | 477/108 |
| 2006/0161324 | A1 * | 7/2006 | Ozawa et al. | 701/50 |
| 2006/0167607 | A1 * | 7/2006 | Nakamura et al. | 701/50 |

FOREIGN PATENT DOCUMENTS

| | | |
|---|---|---|
| JP | 01-244140 | 9/1989 |
| JP | 04-123938 | 4/1992 |
| JP | 08-158906 | 6/1996 |
| JP | 2004-190615 | 7/2004 |
| JP | 2005061322 A * | 3/2005 |

* cited by examiner

*Primary Examiner*—Lesley Morris
*Assistant Examiner*—Bryan A Evans
(74) *Attorney, Agent, or Firm*—Busch Blackwell Sanders Welsh & Katz

(57) ABSTRACT

A construction machine capable of increasing a frictional force and an acceleration performance without causing unwanted slip and an excessive load to a transmission by a driving force. The construction machine comprises a first mode to set the maximum output of an engine to a prescribed output, a second mode to limit the maximum output of the engine to an output lower than the prescribed output and a mode selector switch used for a operator to select from the plurality of modes. The construction machine also comprises control means that controls the machine to operate in the second mode regardless of the mode selected by the mode selector switch when a vehicle speed is equal to or less than a prescribed speed and the opening of an accelerator is equal to or more than a prescribed opening.

3 Claims, 5 Drawing Sheets

| MODE SELECTOR SWITCH: N MODE | MODE SELECTOR SWITCH: P MODE | |
|---|---|---|
| | TRAVAILING SPEED ≤ 1 AND ACCELERATOR OPENING DEGREE ≥ 80% | OTHER THAN THE LEFT CELL |
| SEND N MODE OPERATION COMMAND | | SEND P MODE OPERATION COMMAND |

CONSTRUCTION MACHINE

CROSS-REFERENCE TO RELATED APPLICATIONS

This application is based on PCT Application No. PCT/JP2005/02 1998 filed Nov. 30, 2005, which claims Priority from Japanese patent application No. 2004-358078 filed Dec. 10, 2004.

TECHNICAL FIELD

The present invention relates to a construction machine.

BACKGROUND ART

FIG. 6 shows a simplified drawing of a wheel loader which is one of construction machines to which the present invention pertains. The wheel loader as shown in FIG. 6 operates the work equipment 52 by converting the engine power into the hydraulic power, and travels by transmitting the engine power to the drive wheels 70 via the transmission. This wheel loader is often used for loading the pile such as earth and sand into the dump truck.

For this type of construction machine, large driving force of drive wheels for excavating and scooping (hereinafter referred to as "driving force") as well as sufficient acceleration and speed during carrying the earth and sand are required.

The operator carries out various operations such as loading operation while controlling the engine speed by adjusting the accelerator (accelerator pedal). More specifically, when large driving force is necessary for excavating and scooping, or prompt acceleration is required, the operator largely steps on the accelerator to obtain sufficient engine power. Additionally, when high speed is necessary, the operator largely steps on the accelerator to obtain the high engine speed.

On the other hand, for this type of construction machine, in order to improve the fuel efficiency, there has been proposed a construction machine that is enabled to switch a first mode in which the maximum engine speed is set to a prescribed engine speed and a second mode in which the engine speed is limited to an engine speed less than such prescribed engine speed to realize better fuel efficiency. When the operator selects the second mode, performance of acceleration and maximum traveling speed is sacrificed to some degree, but the fuel efficiency during the operation becomes better than that in the first mode. It should be noted that there is Patent Literature 1 that provides similar technique to the above-stated technique.

Patent Literature 1: Japanese Patent Application Laid-open No. 2004-190615

DISCLOSURE OF THE INVENTION

Problems to be Solved by the Invention

Being provided with a high-powered engine, the above-stated construction machine can obtain powerful driving force and better acceleration. However, this configuration requires an increase in the size of the transmission or other driving force transmitting section so as to withstand the maximum driving force. While this type of construction machine needs the maximum driving force during the excavation or scooping of earth and sand or other piles, too much driving force results in a slip of the driving wheels, and may speed up the wear of the devices. Thus, in the construction machine having the above-stated two modes, since the maximum driving force is naturally limited by the slip limit, the engine, transmission and the like are designed considering this limitation. Needless to say, the driving force and the acceleration performance in the second mode is lower than that of the first mode. However, in order to improve the operating efficiency of the machine, more powerful driving force and better acceleration performance are desired.

The present invention has been made in view of the above problems and has an object to provide a construction machine having a high friction force and acceleration performance without causing unwanted slip and excessive load to the transmission and the like by the driving force.

Means to Solve the Problems

A first aspect of the invention provides a construction machine that includes a first mode in which a maximum output of an engine is a prescribed output, a second mode in which the maximum output of the engine is limited to an output less than the prescribed output, and a mode selector switch for enabling an operator to select from the plurality of modes, the construction machine comprising: an accelerator for enabling the operator to adjust an engine speed of the engine, traveling speed detecting means that detects a traveling speed, and a controller that, when the traveling speed detected by the traveling speed detecting means is a prescribed speed or slower and an opening degree of the accelerator is a prescribed opening degree or larger, controls an operation in the second mode regardless of the mode selected by the mode selector switch.

A second aspect of the invention provides a construction machine that includes a first mode in which a maximum engine speed of an engine is a prescribed speed, a second mode in which the maximum engine speed of the engine is limited to a speed less than the prescribed speed, and a mode selector switch for enabling an operator to select from the plurality of modes, the construction machine comprising: an accelerator for enabling the operator to adjust an output of the engine, traveling speed detecting means that detects a traveling speed, and a controller that, when the traveling speed detected by the traveling speed detecting means is a prescribed speed or slower and an opening degree of the accelerator is a prescribed opening degree or larger, controls an operation in the second mode regardless of the mode selected by the mode selector switch.

A third aspect of the invention provides a construction machine that includes a first mode in which an engine is operated under a first torque curve, a second mode in which the engine is operated under a second torque curve that is lower than the first torque curve, and a mode selector switch for enabling an operator to select from the plurality of modes, the construction machine comprising: an accelerator for enabling the operator to adjust an output of the engine, traveling speed detecting means that detects a traveling speed, and a controller that, when the traveling speed detected by the traveling speed detecting means is a prescribed speed or slower and an opening degree of the accelerator is a prescribed opening degree or larger, controls an operation in the second mode regardless of the mode selected by the mode selector switch.

Effect of the Invention

According to the first to the third aspects of the inventions, when the traveling speed is the prescribed speed or slower and the accelerator opening is the prescribed degree or larger, the construction machine is controlled so as to be operated in the second mode regardless of the mode that is selected in the mode selector switch. Thus, even when the operator selects the first mode and operates the construction machine, the driving force does not exceed the maximum driving force set in the second mode. As a result, even in the first mode, the driving wheels do not unnecessarily slip and the excess load is not applied to the transmission and the like. Additionally, since the flexibility of the setting for the torque characteristics becomes increased, the torque characteristics can be appropriately set, whereby the driving force and the acceleration performance can be improved. Furthermore, because the two-mode selector provided in the conventional construction machine can also be used, the configuration becomes extremely simple.

BEST MODE FOR CARRYING OUT THE INVENTION

Next, taking a wheel loader as an example, the specific embodiment of the aspect of the present invention will be described with reference to the drawings. As explained using FIG. 6, the wheel loader comprises a vehicle body 51 and a work equipment 52 protruded from the vehicle body 51, converts the engine output into the hydraulic power to operate the work equipment 52, and transmits the engine output to drive wheels 70 via a transmission to travel.

FIG. 1 shows a simplified configuration diagram illustrating an embodiment of the control device of the construction machine pertaining to the present invention. As shown in FIG. 1, the control device comprises a vehicle body controller 1, an engine controller 2 and an engine 3, which are included in the above-stated vehicle body 51. Additionally, a mode selector switch 4 that switches between a P mode and an N mode, an accelerator 5, a traveling speed sensor 6 as traveling speed detecting means 20, and the like are connected to the controller 1. The P mode corresponds to the first mode in the present invention, the mode in which the maximum engine speed of the engine 3 is set to the prescribed engine speed. The N mode corresponds to the second mode in the present invention, the mode in which the maximum engine speed of the engine 3 is limited to lower engine speed than the above-stated prescribed engine speed (See FIG. 3). In this embodiment, the maximum engine speed in the N mode is limited to 80% of the maximum engine speed in the P mode.

The vehicle body controller 1 is connected to the engine controller 2 and the mode selector switch 4. The opening degree signal of the accelerator 5 and the traveling speed signal detected by the traveling speed sensor 6 are input to the vehicle body controller 1. The vehicle body controller 1 sends an operation command signal to the engine controller 2 based on the selected position of the mode selector switch 4, the accelerator opening degree signal, and the traveling speed signal.

FIG. 2 shows the operation command signal sent by the vehicle body controller 1. As shown in FIG. 2, when the N mode is selected in the mode selector switch 4, the vehicle body controller 1 outputs an N mode operation command to the engine controller 2. When the P mode is selected in the mode selector switch 4, the vehicle controller 1 sends the N mode operation command to the engine controller 2 at the time when the traveling speed is a prescribed speed (V1 in this embodiment) or slower and the opening degree of the accelerator 5 is a prescribed degree (80% in this embodiment) or larger, and sends the P mode operation command to the engine controller 2 at the time when the traveling speed exceeds the prescribed speed or the opening degree of the accelerator 5 is less than the prescribed degree.

The opening degree signal of the accelerator 5 is also input to the engine controller 2, and the engine speed of the engine 3 is limited in accordance with the opening degree of the accelerator 5. The engine controller 2 controls, in accordance with the accelerator opening degree, the engine 3 in the P mode at the time when the P mode operation command is sent from the vehicle body controller 1, and in the N mode at the time when the N mode operation command is sent from the vehicle body controller 1. In other words, control means 21 comprises the vehicle body controller 1 and the engine controller 2. And when the vehicle speed detected by the traveling speed detecting means 20 is the prescribed speed or slower and the opening degree of the accelerator 5 is the prescribed degree or larger, the control means 21 controls the operation in the second mode, regardless of the mode selected in the mode selector switch 4.

FIG. 3 is a diagram illustrating a torque characteristic according to the present embodiment, and shows the engine speed in the horizontal axis and the torque in the vertical axis. FIG. 4 is a diagram illustrating the driving force characteristics according to the present embodiment, and shows the traveling speed in the horizontal axis and the driving force in the vertical axis.

In FIG. 3, a graph 10 shown in a solid line is an engine torque curve in the P mode, and a graph 11 shown in a solid line is an engine torque curve in the N mode. The maximum engine speed in the N mode is limited to 80% of the maximum engine speed in the P mode. In FIG. 3, graphs drawn in broken lines show the torque absorbed by the torque converter of the transmission (hereinafter referred to as "torque converter absorbing torque"). A graph 12 is a torque converter absorbing torque curve at the traveling speed 0, a graph 13 is a torque converter absorbing torque curve at the traveling speed V1, and a graph 25 is a torque converter absorbing torque curve at the traveling speed V2 (V2>V1).

In FIG. 4, a graph 10*a* shown in a solid line is a driving force characteristics curve in the P mode, and a graph 11*a* shown in a solid line is a driving force characteristics curve in the N mode. Incidentally, an appropriate maximum driving force is designed and set based on the slip limit of the driving wheels 70 and the like. Additionally, an appropriate maximum torque to be transmitted from the engine 3 to the transmission is determined based on the set appropriate maximum driving force. This appropriate maximum torque is shown in FIG. 3 by an alternate long and short dashed line 26, and this appropriate maximum driving force is shown in FIG. 4 by an alternate long and short dashed line 26*a*.

As shown in FIG. 3, during the operation under the P mode, the torque converter absorbing torque at the traveling speed V1 in the full accelerator opening is a torque at an intersection point a1 of the graph 10 and the graph 13, and the value of the traveling speed V1 is determined such that the torque at the point a1 becomes a degree of the appropriate maximum torque. Additionally, during the operation under the N mode, the torque converter absorbing torque at the traveling speed 0 in the full accelerator opening is a torque at an intersection point b0 of the graph 11 and the graph 12, and the torque at the intersection point b0 is determined so as not to exceed the appropriate maximum torque.

Using FIG. 3 and FIG. 4, the description will be made of the change in the torque converter absorbing torque in a case when the earth and sand or other pile is excavated or scooped at the full accelerator opening. The wheel loader that initially travels at the traveling speed V2 gradually decreases its speed as the increase in the traveling load, which is resulted from the wheel loader going into the pile, and finally stops. Since the accelerator opening remains in the full opening position, at the time when the traveling speed decreases to the traveling speed V1, the operation mode of the engine 3 switches from the P mode to the N mode due to the above-described limitation. Thus, as shown in the direction of the arrow A in FIGS. 3 and 4, the torque converter absorbing torque and the driving force change from the point a2 through the point a1 to the point b0.

Thus, the torque converter absorbing torque will not exceed the appropriate maximum torque and the driving force will not exceed the appropriate maximum driving force, thereby preventing the unwanted slip of the drive wheels 70 and the excessive load to the transmission and the like. Additionally, because the flexibility for the setting of the torque characteristics (or the driving force characteristics) is enhanced, the torque characteristics can be appropriately set, whereby the driving force and the acceleration performance can be improved.

It should be noted that the maximum engine speed during the operation in the N mode is approximately 80% of the maximum engine speed during the operation in the P mode. This almost corresponds to the fact that the opening degree of the accelerator, which is one of the conditions for changing from the P mode to the N mode, is 80%. As a result, even when the accelerator 5 is in any opening degree, the torque converter absorbing torque will never exceed the appropriate maximum torque.

In order to easily understand the effect of the present invention, under the situation similar to the above-described situation, it is assumed that, the above-described control according to the present invention is not carried out. In this case, the engine 3 keeps its operation under the P mode until the vehicle body is completely stopped due to the load. If the description is made with reference to FIG. 3, the torque converter absorbing torque changes from the point a2 to the point a0. Since the torque converter absorbing torque at the point a0 exceeds the appropriate maximum absorbing torque, the drive wheels 70 will unwantedly slip and the excessive load will be applied to the transmission and the like unless the operator reduces the opening degree of the accelerator, speeding up the wear of the device.

Next, the second embodiment will be described. FIG. 5 shows a diagram illustrating the torque characteristics in the second embodiment. As in the case of FIG. 3, the horizontal axis shows the engine speed, and the vertical axis shows the torque. In the second embodiment, although there is no difference in the maximum engine speed between the N mode operation and the P mode operation, there is difference from the preceding embodiment in that the torque curve during the N mode operation is lower than that during the P mode. Since other configuration and the control details are equal to the above-described embodiment, its description will be omitted.

In FIG. 5, a graph 100 shown in a solid line is an engine curve in the P mode, and a graph 110 shown in a solid line is an engine curve in the N mode. The maximum engine speed in the N mode is limited to approximately 80% of the maximum engine speed in the P mode. A graph 120 is a curve for the torque converter absorbing torque at the traveling speed 0, and a graph 130 is a curve of the torque converter absorbing torque at the traveling speed V1. A graph 250 is a curve of the torque converter absorbing torque at the traveling speed V2 (V2>V1). In other words, in the second embodiment, the first mode is a mode in which the engine 3 is performed under the first torque curve, and the second mode is a mode in which the operation is performed under the second curve lower than this first curve. It should be noted that the appropriate maximum torque is indicated by an alternate long and short dashed line 260.

The description will be made using FIG. 5 as to the change in the torque converter absorbing torque when the P mode is selected and the earth and sand or other pile is excavated or scooped with the accelerator in the full opening position. The wheel loader that initially travels at the traveling speed V2 gradually decreases its speed as the increase in the traveling load, which is resulted from the wheel loader going into the pile, and finally stops. Since the accelerator opening remains in the full opening position, at the time when the traveling speed decreases to the traveling speed V1, the operation mode of the engine 3 switches from the P mode to the N mode due to the above-described control. Thus, as shown in the direction of the arrow A2 in FIG. 5, the torque converter absorbing torque and the driving force change from the point a22 through the point a12 to the point b02.

Thus, the torque converter absorbing torque will not exceed the appropriate maximum torque and the driving force will not exceed the maximum appropriate driving force, thereby preventing the unwanted slip of the drive wheels 70 and the excessive load to the transmission and the like. Additionally, because the flexibility for the setting of the torque characteristics (or the driving force characteristics) is enhanced, the torque characteristics can be appropriately set, whereby the driving force and the acceleration performance can be improved.

The description has been made of the embodiments, as examples, in the case that the maximum engine speed is changed between the P mode and the N mode, and in the case that the torque curve is changed between the P mode and the N mode. However, the present invention is not limited to the above-described embodiments, and the same effect can be achieved from the present invention by applying it to a case, for example, that the maximum power of the engine is changed by changing both of the maximum engine speed and the torque curve between the P mode and the N mode. In other words, the wheel loader may be controlled such that, by setting the first mode as a mode that the maximum output of the engine 3 is a prescribed output and the second mode as a mode that the maximum output of the engine 3 is limited to the output lower than the above-stated output, when the traveling speed is a prescribed speed or slower and the opening degree of the accelerator 5 is a prescribed degree or larger, the operation is performed under the second mode regardless of the mode selected in the mode selector switch 4. Additionally, the description has been made using the wheel loader as one example, but the present invention is not limited to this example, and can be applicable to the same types of various construction machines.

Figures 1, 2:
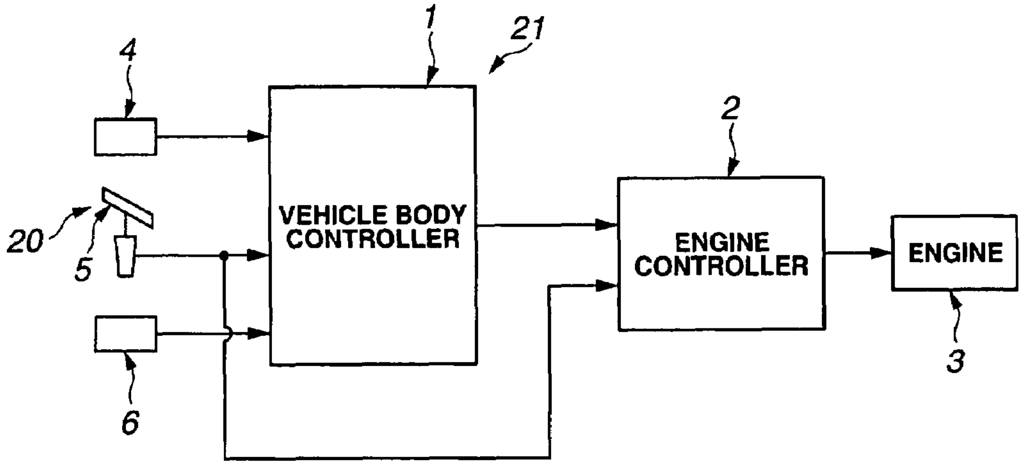
FIG. 1 is a simplified configuration diagram showing an embodiment of a control device of the construction machine according to the present invention.
FIG. 2 is a diagram showing an operation command sent by the vehicle body controller.
Figure 3:
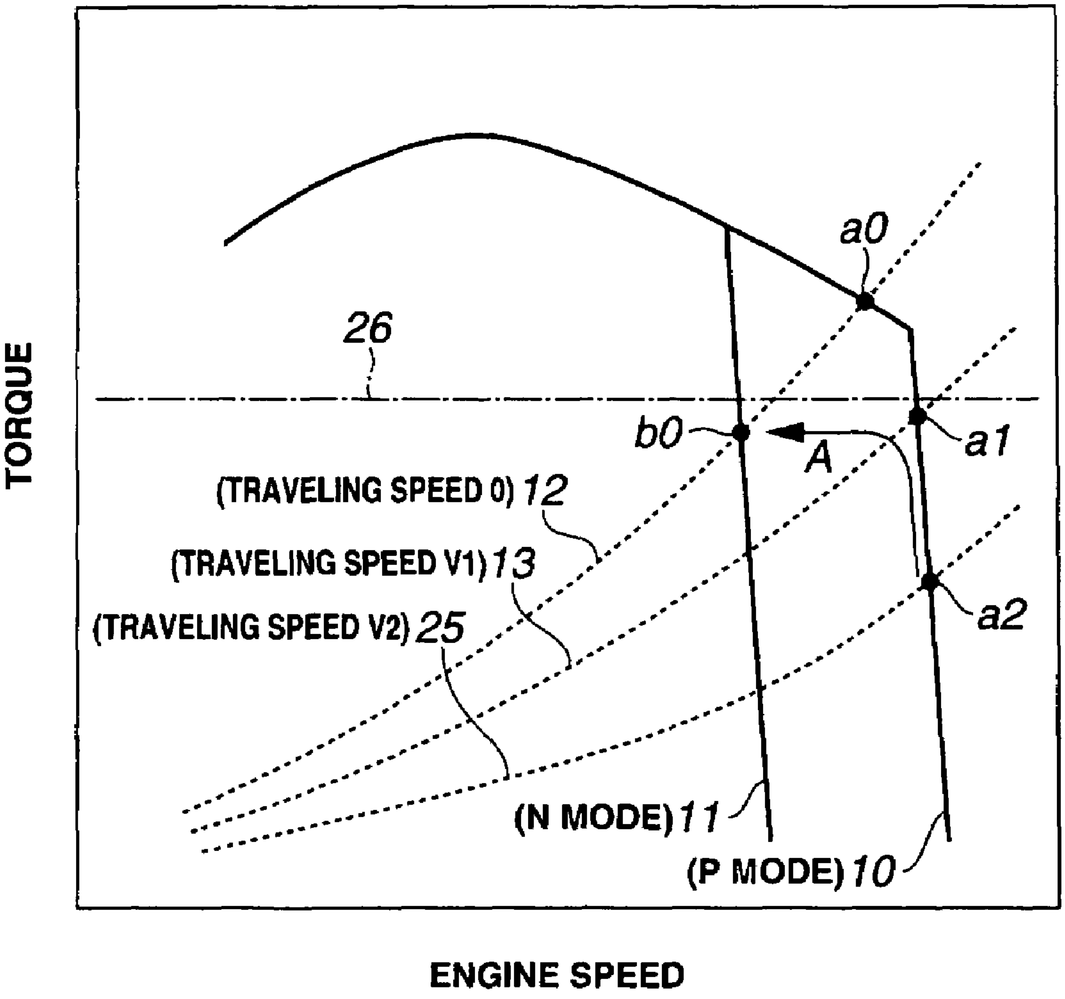
FIG. 3 is a diagram showing a torque characteristic according to the present embodiment.
Figure 4:
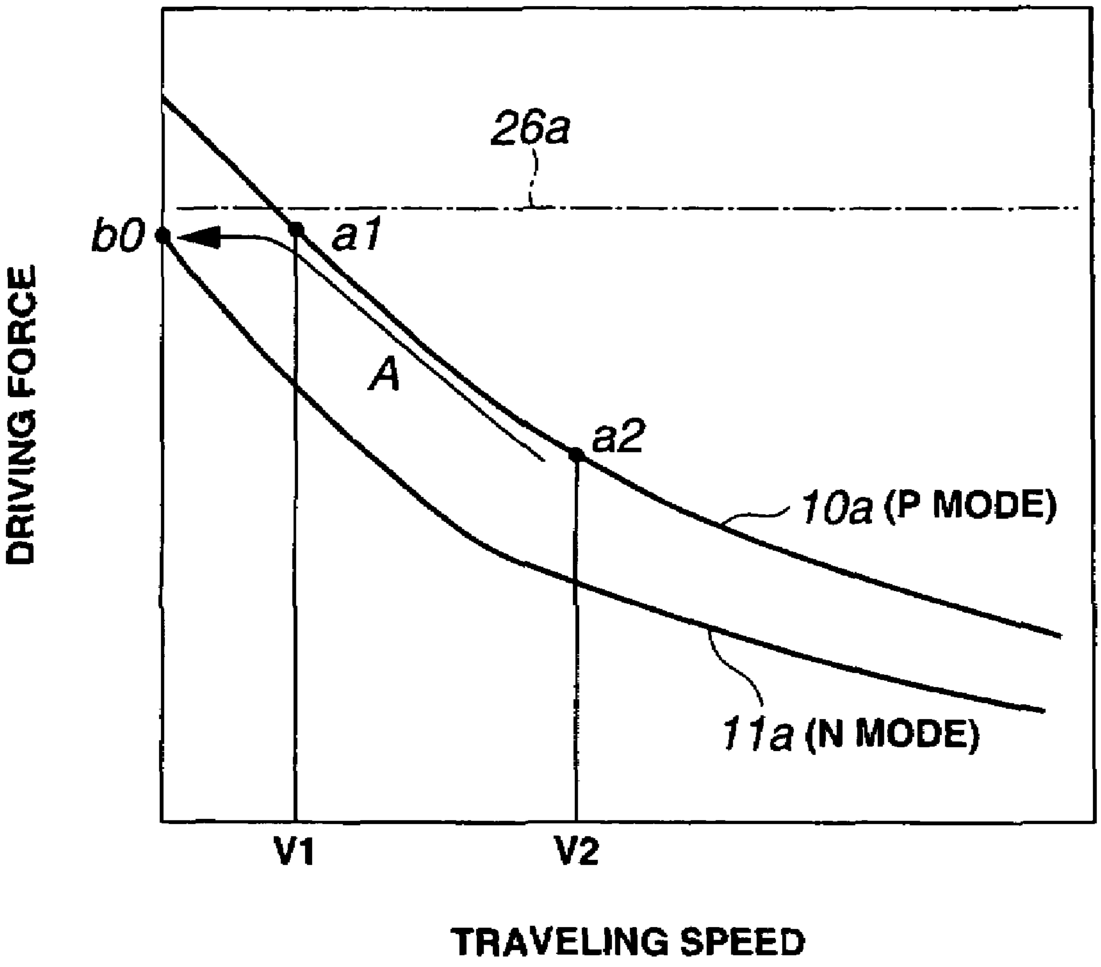
FIG. 4 is a diagram showing a driving force characteristic according to the present embodiment.
Figure 5:
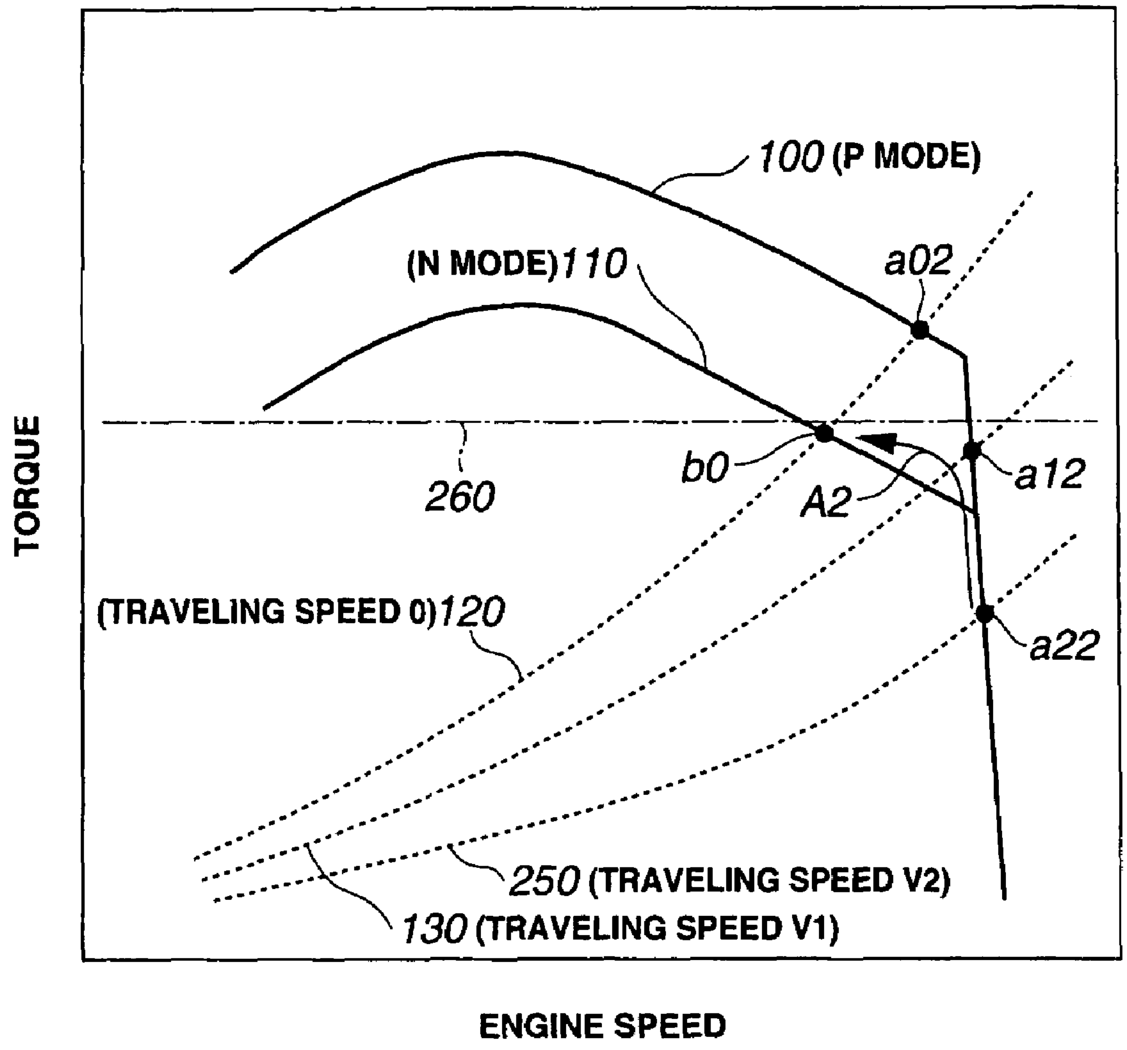
FIG. 5 is a diagram showing a torque characteristic according to the second embodiment.
Figure 6:
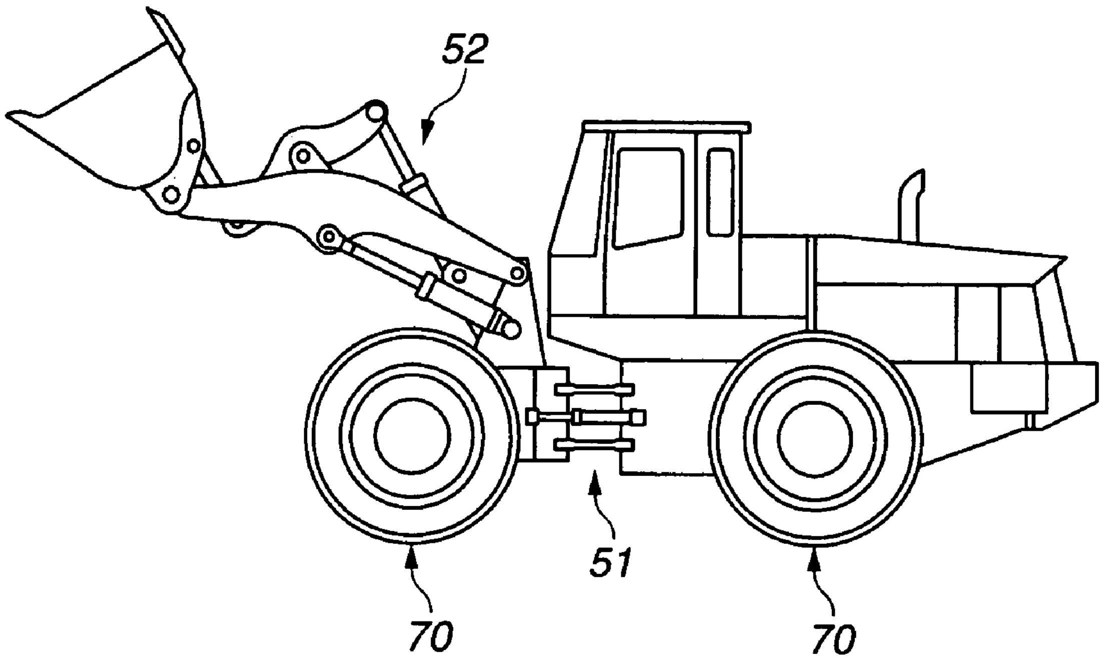
FIG. 6 is a simplified diagram of a wheel loader.

The invention claimed is:

1. A construction machine that includes a first mode in which a maximum output of an engine is a prescribed output, a second mode in which the maximum output of the engine is limited to an output less than the prescribed output, and a mode selector switch for enabling an operator to select from the plurality of modes, the construction machine comprising:

an accelerator for enabling the operator to adjust an engine speed of the engine, traveling speed detecting means that detects a traveling speed, and a controller that, when the first mode is selected by means of the mode selector switch and the traveling speed detected by the traveling speed detecting means is a prescribed speed or slower and an opening degree of the accelerator is a prescribed opening degree or larger, controls an operation in the second mode regardless of the mode selected by the mode selector switch wherein maximum driving force at the time when the second mode is selected is set to a value that does not exceed an appropriate maximum driving force, and wherein each of the prescribed speed and the prescribed opening degree is set such that the driving force at the time when the first mode is selected does not exceed the maximum driving force at the time when the second mode is selected.

2. A construction machine that includes a first mode in which a maximum engine speed of an engine is a prescribed speed, a second mode in which the maximum engine speed of the engine is limited to a speed less than the prescribed speed, and a mode selector switch for enabling an operator to select from the plurality of modes, the construction machine comprising:

an accelerator for enabling the operator to adjust an engine speed of the engine, traveling speed detecting means that detects a traveling speed, and a controller that, when the first mode is selected by means of the mode selector switch and the traveling speed detected by the traveling speed detecting means is a prescribed speed or slower and an opening degree of the accelerator is a prescribed opening degree or larger, controls an operation in the second mode regardless of the mode selected by the mode selector switch wherein maximum driving force at the time when the second mode is selected is set to a value that does not exceed an appropriate maximum driving force, and wherein each of the prescribed speed and the prescribed opening degree is set such that the driving force at the time when the first mode is selected does not exceed the maximum driving force at the time when the second mode is selected.

3. A construction machine that includes a first mode in which an engine is operated under a first torque curve, a second mode in which the engine is operated under a second torque curve that is lower than the first torque curve, and a mode selector switch for enabling an operator to select from the plurality of modes, the construction machine comprising:

an accelerator for enabling the operator to adjust an engine speed of the engine, traveling speed detecting means that detects a traveling speed, and a controller that, when the first mode is selected by means of the mode selector switch and the traveling speed detected by the traveling speed detecting means is a prescribed speed or slower and an opening degree of the accelerator is a prescribed opening degree or larger, controls an operation in the second mode regardless of the mode selected by the mode selector switch wherein maximum driving force at the time when the second mode is selected is set to a value that does not exceed an appropriate maximum driving force, and wherein each of the prescribed speed and the prescribed opening degree is set such that the driving force at the time when the first mode is selected does not exceed the maximum driving force at the time when the second mode is selected.

* * * * *